US006389151B1

(12) United States Patent
Carr et al.

(10) Patent No.: US 6,389,151 B1
(45) Date of Patent: May 14, 2002

(54) PRINTING AND VALIDATION OF SELF VALIDATING SECURITY DOCUMENTS

(75) Inventors: Jonathan Scott Carr; Burt W. Perry, both of Beaverton; Geoffrey B. Rhoads, West Linn, all of OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/442,780

(22) Filed: Nov. 18, 1999

Related U.S. Application Data
(60) Provisional application No. 60/109,259, filed on Nov. 19, 1998.

(51) Int. Cl.[7] .................................................. G06K 9/00
(52) U.S. Cl. ....................................... 382/100; 382/115
(58) Field of Search ................................ 382/135, 137, 382/100, 115

(56) References Cited

U.S. PATENT DOCUMENTS

| | | | | |
|---|---|---|---|---|
| 5,284,364 A | | 2/1994 | Kanti | 283/87 |
| 5,636,292 A | | 6/1997 | Rhoads | |
| 5,748,783 A | | 5/1998 | Rhoads | |
| 5,841,886 A | | 11/1998 | Rhoads | |
| 5,949,885 A | * | 9/1999 | Leighton | 380/54 |
| 5,995,625 A | * | 11/1999 | Sudia et al. | 380/25 |

OTHER PUBLICATIONS

Ratha, N. et al. "Secure Data Hiding in Wavelet Compressed Fingerprint Images", ACM Multimedia 2000 Workshop, Oct. 30, 2000, pp. 127–130.*
Pankanti, S. et al. "Verification Watermarks on Fingerprint Recognition and Retrieval", IS&T/SPIE Conference on Security and Watermarking of Multimedia, Oct. 2000, pp. 66–78.*
Perry, B. et al. "Digital Watermarks as a Security Feature for Identity Documents", Proceedings of SPIE, vol. 3973, Apr. 2000, pp. 80–87.*
Anand, D,. and Niranjan U. C., "Watermarking Medical Images with Patient Information", IEEE, Oct. 29, 1998.*

* cited by examiner

Primary Examiner—Matthew C. Bella
(74) Attorney, Agent, or Firm—Elmer Galbi

(57) ABSTRACT

Security documents which has multiple fields or areas each of which contains information that is perceptible in more than one way: One field can contain a visually perceptible image and a digital watermark that can be detected when the image is scanned and processed, another field can contain machine readable OCR text that can be read by both a human and by a programmed computer, and still another field can contain watermark data which can be correlated to the output of a fingerprint reader or apparatus which scans a user's iris. Documents are produced by begining with a template which defines the placements of elements on the document and the interrelationships between hidden and visual information on the document. The template specifies the placement of elements such as images, photographs, and text and it also specifies the interrelationship between information that is visually perceptible to a user of the document and information that is hidden by means of digital watermarks. Different hidden digital watermark data is included in multiple elements of the document. The watermarks in the different graphic elements of the document are correlated to each other and correlated to the visual material on the document. Thus, the document can not be forged by replacing one element (such as a picture) with a similar element from another document. In order to produce a document defined by a particular template, appropriate pictures, graphics and digital data are extracted from a data bank, and watermark data is embedded in the pictures and graphics as appropriate. The merged digital data is then sent to a printing engine and the final document is produced. An automatic validation system of the present invention reads multiple fields on the document, and it also automatically detects information about the user. The various information is correlated to validate the document.

8 Claims, 3 Drawing Sheets

PRINTING AND VALIDATION OF SELF VALIDATING SECURITY DOCUMENTS

RELATED APPLICATIONS

This application is a non-provisional application of provisional application 60/109,259 filed Nov. 19, 1998. The present application is also a continuation in part of application 09/074,034 filed May 6, 1998 (now pending) and a continuation on part of application 08/763,847 filed Dec. 4, 1996 (now patent 5,841,886) with is a continuation of application 08/512,993 filed Aug. 9, 1995 (now abandoned). Priority of the above listed applications is claimed.

FIELD OF THE INVENTION

The present invention relates to the security documents such as passports, driver's licenses, credit cards, etc. and to systems for producing and validating such documents.

BACKGROUND OF THE INVENTION

Many security documents contain a picture of the owner of the document. For example, a driver's license generally includes a picture of the driver and a passport generally includes a picture of the owner of the passport. Validation of such documents is performed by comparing the actual physical appearance of the person possessing the document to the picture on the document. A common counterfeiting techniques involves replacing the picture on a security document with a picture of someone who is not the owner of the document.

U.S. Pat. No. 5,841,886 which will issue Nov. 24, 1998 describes a technique whereby a digital watermark is included in the picture on a security document. The security document contains human readable text that is related to the data contained in the watermark. The document can be inserted into a scanner which will read the watermark and the operator can compare the output of watermark reader to the text to insure that the person possessing the document is the legitimate owner.

Custom printing systems are available which accept data from multiple sources and which produce documents which are tailored to individual customer characteristics or to information concerning an individual customer. Such systems can for example produce personalized documents that include both fixed information that is on each document that is printed and variable information such as personal information about an individual's account at an institution such as a bank. One such system is commercially marketed under the trademark "PageFlex" by Bitstream Inc. or Cambridge Mass.

Likewise the technology for producing images which contain steganographic information in the form of digital watermarks is well developed. For example see U.S. Pat. No. 5,636,292, U.S. Pat. No. 5,748,783 or the "Communications of the ACM" published July 1998 Vol. 41. No. 7 pages 31 to 77. Commercial products which can store and read digital watermarks are also widely available. Examples of such products include "Adobe PhotoShop" Versions 4.0 and 5.0 and "Adobe ImageReady" Version 1.0 which are marketed by Adobe Corporation, "CorelDRAW" Versions 7 and 8, and "Corel PHOTO-PAINT" Versions 7 and 8 which are marketed by Corel Corporation, and "Micrografx Webtricity" Versions 1 and 2, "Micrografx Graphics Suite 2", and "Micrografx Picture Publisher" Versions 7 and 8 which are marketed by Micrografx Corporation.

Security documents such as passports and drivers licenses have traditionally contained both images and printed text. However, the images and the text in such documents are generally prepared in separate processes and merely merged at a final step in the overall production.

The present invention is directed to an improved security document which has several correlated multi-level self validating features. The present invention is also directed to an improved overall method and system for producing security documents and to automatic authentication systems for such documents. With the present invention the document contains a number of different kinds of information that is hidden from normal view and which can be correlated to validate the document. The validation can be done entirely automatically decreasing the need for human intervention. With the prior art systems, a human being such as an immigration officer must examine a passport to determine if the person presenting the document is the rightful owner of the document. With the present invention, the authentication can be done entirely automatically, leaving the human operator free to handle non-routine situations.

SUMMARY OF THE INVENTION

The present invention provides security documents which has multiple fields or areas each of which contains information that is perceptible in more than one way. For example, one field can contain a visually perceptible image and a digital watermark that can be detected when the image is scanned and processed, another field can contain machine readable OCR text that can be read by both a human and by a programmed computer, and still another field can contain watermark data which can be correlated to the output of a fingerprint reader or apparatus which scans a user's iris.

Documents in accordance with the present invention are produced by a system and method which begins with a template which defines the placements of elements on the document and the interrelationships between hidden and visual information on the document. That is, the template specifies the placement of elements such as images, photographs, and text and it also specifies the interrelationship between information that is visually perceptible to a user of the document and information that is hidden (not perceptible to a user) by means of digital watermarks. Different hidden digital watermark data is included in multiple elements of the document. The watermarks in the different graphic elements of the document are correlated to each other and correlated to the visual material on the document. In this way the document can not be forged by replacing one element (such as a picture) with a similar element from another document. In order to produce a document defined by a particular template, appropriate pictures, graphics and digital data are extracted from a data bank, and watermark data is embedded in the pictures and graphics as appropriate. The merged digital data is then sent to a printing engine and the final document is produced.

An automatic validation system of the present invention reads multiple fields on the document, and it also automatically detects information about the user. The various information is correlated to validate the document.

DESCRIPTION OF A PREFERRED EMBODIMENT

Figure 1:
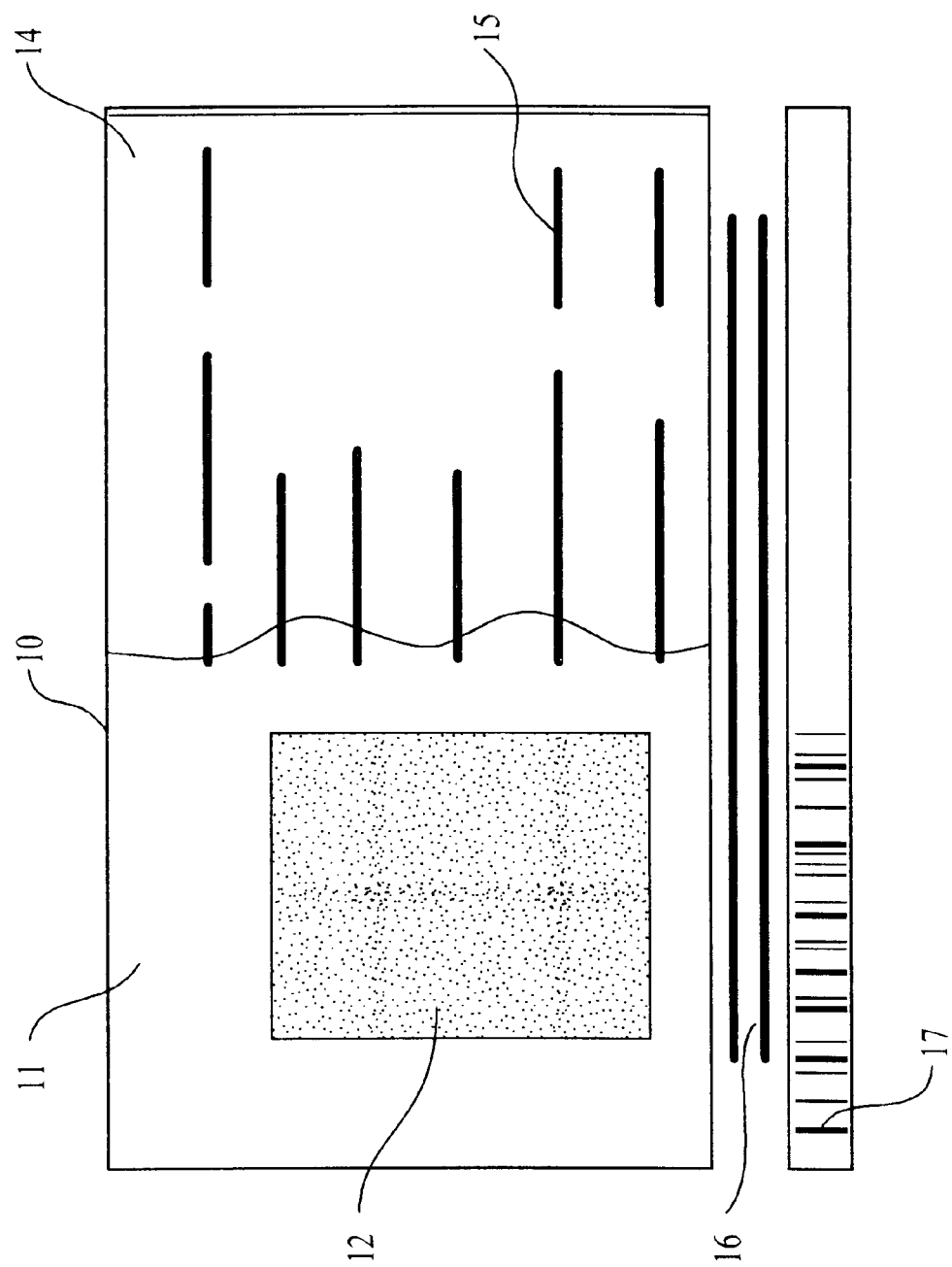
FIG. 1 illustrates a security document in accordance with the present invention.

A diagram of a security document in accordance with the present invention is shown in FIG. 1. The security features on the document are a pre-printed background 11 which has an image or pattern (not visible in FIG. 1) which contains a digital watermark. The image in background 11 may contains lines the width of which are varied to carry a watermark in accordance with the technique described in co-pending application 09/074034 filed May 6, 1998, the disclosure of which in incorporated herein in its entirety.

The document also contains a photograph 12 which shows the owner of the document. This photograph 12 contains a watermark such as that described in US. Pat. No. 5,841,886 which will issue Nov. 24, 1998. The personalized background 14 can for example be a background image which corresponds to the image 12. While the personalized image 14 corresponds to the photograph 12, in area 14 the image is printed as a background image. Background images of various types are conventional, for example personal checks frequently have background images of animals, mountains, etc. The background text makes it hard to change the human readable text 15 which is printed over the background text. The bottom of the document has machine readable OCR-B text 16 and a Bar code 17.

It should be clearly understood that the document shown in FIG. 1 is merely illustrative of the various elements that can be combined to form a security document. The exact layout can vary depending upon the needs of the particular application. If desired for a particular application, the document can be much more complex than the document shown in FIG. 1. The document can have many more fields and elements than does the document shown in FIG. 1. Furthermore the document could contain the various other known technology for preventing counterfeiting such as special paper and special ink.

Document shown in FIG. 1 can for example be a document such as a driver's license in which case the picture 12 would be a picture of the owner of the license. Graphic image 11 could for example be a state seal. The text 15 could for example include the driver's license number, the owners age, and the owners address.

Document 10 can be a passport. In a passport, the hidden digital watermark data in picture 12 and in the other fields could be coordinated as follows:

| | Watermark contains | Correlates to |
|---|---|---|
| Pre-printed background 11 | unique document "batch" number | |
| Photo 12: | Batch number and passport number (cryptographically encoded) | OCR-B version of passport number, Human readable passport number, Master document |
| Personalized background 14 | "hash" of fingerprint | fingerprint of the holder which is automatically read |
| Bar code 17 | Passport number (in code not in watermark) | Watermark in photo 12 |
| OCR-B text 16 | Passport number Batch number (in text not in watermark) | Info in photo 12, background 11 And Bar code 17 |

An important point is that the various elements of hidden and visual information are coordinated in such a manner that the document is self authenticating. The hidden data in one field can be correlated with the hidden data in another field to insure that the document has not been altered.

If for example one tried to alter a document by replacing picture 12 with a different picture, the new picture would either contain no hidden data, or if it were a picture taken from a different document, the numbers stored in the picture would not match the printed information in text field 15.

If the picture from one document were substituted for the picture in a second document, the cryptographically encoded serial numbers could be used to determine the origin of the picture. It is noted that while in the example shown above, both the Batch number and passport number are cryptographically encoded, other numbers such as a serial number or an ID number could also be encoded in a special manner.

Figure 2:
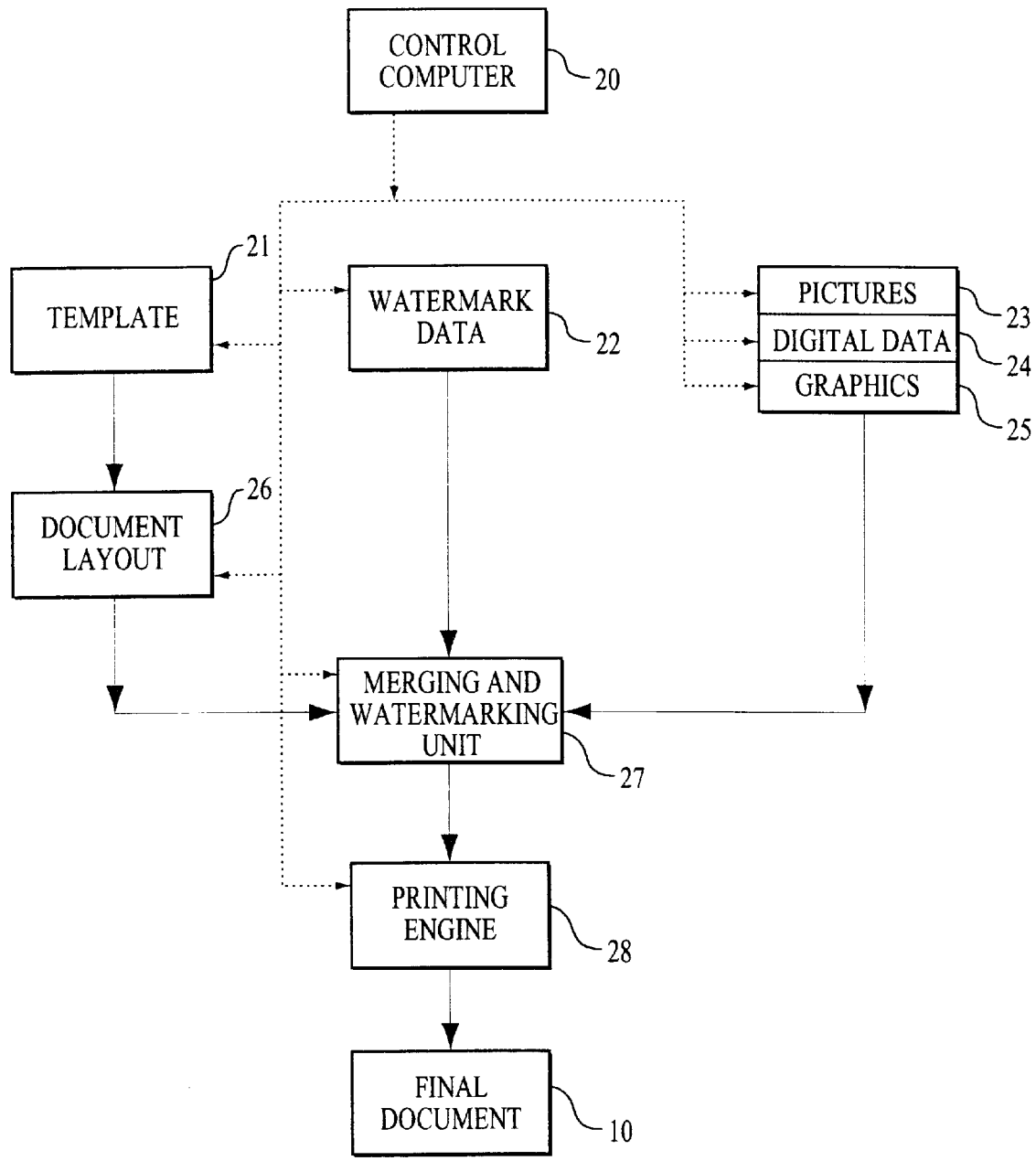
FIG. 2 is an overall diagram of a preferred embodiment of a system to produce security documents in accordance with the present invention.

FIG. 2 shows an overall diagram of a system for producing document 10. The system includes a number of units, the operation of which is controlled and coordinated by a control computer 20. The following explanation will illustrate how the embodiment shown in FIG. 2 can be used to produce a document such as the document shown in FIG. 1.

A template 21 is used to define the overall characteristics of a document. The characteristics specified by template 21, including the fields on the document, the data printed in any text fields and the watermarks included in each image included on the document.

The template 21 is used by document layout device 26 to layout a particular document for production. Data which is to be included in the watermarks in any image field are stored in Watermark data store 22. Any pictures, text data, and Graphics are stored in units 23, 24 and 25 respectively.

The document layout from unit 26, the digital watermark data from unit 22 and the pictures, text data and graphics from units 23, 24, and 25 are sent to Merging and watermarking unit 27. Unit 27 applies watermarks to pictures and graphics as specified by the layout information from unit 11. Application of the watermarks to the pictures and graphics can be done in a conventional manner; however, prior to sending the watermark payload (i.e. the data stored in the watermark) to the watermarking engine, the data can be passed through a conventional encryption program. Encrypting the payload data provides an added assurance that a counterfeiter could not make a counterfeit document. The level of encryption could be any level appropriate tot he value of the document.

The output from the Merging and watermarking unit 27 is then sent to a conventional printing engine 28 which produces a final document 10.

Watermark Data storage 22, picture storage 23, digital data storage 24 and graphics storage 25 can be conventional data storage servers. Physically they could all be provided by one physical storage unit. Template input unit 21 is a conventional interactive terminal or personal computer with a graphic design program. Merging and watermarking unit 27 can be a conventional watermarking engine.

The system shown in FIG. 2 produces various parts of the security document in a single step, thereby making it much harder to replace one element on a security document with a similar element from another document.

Figure 3:
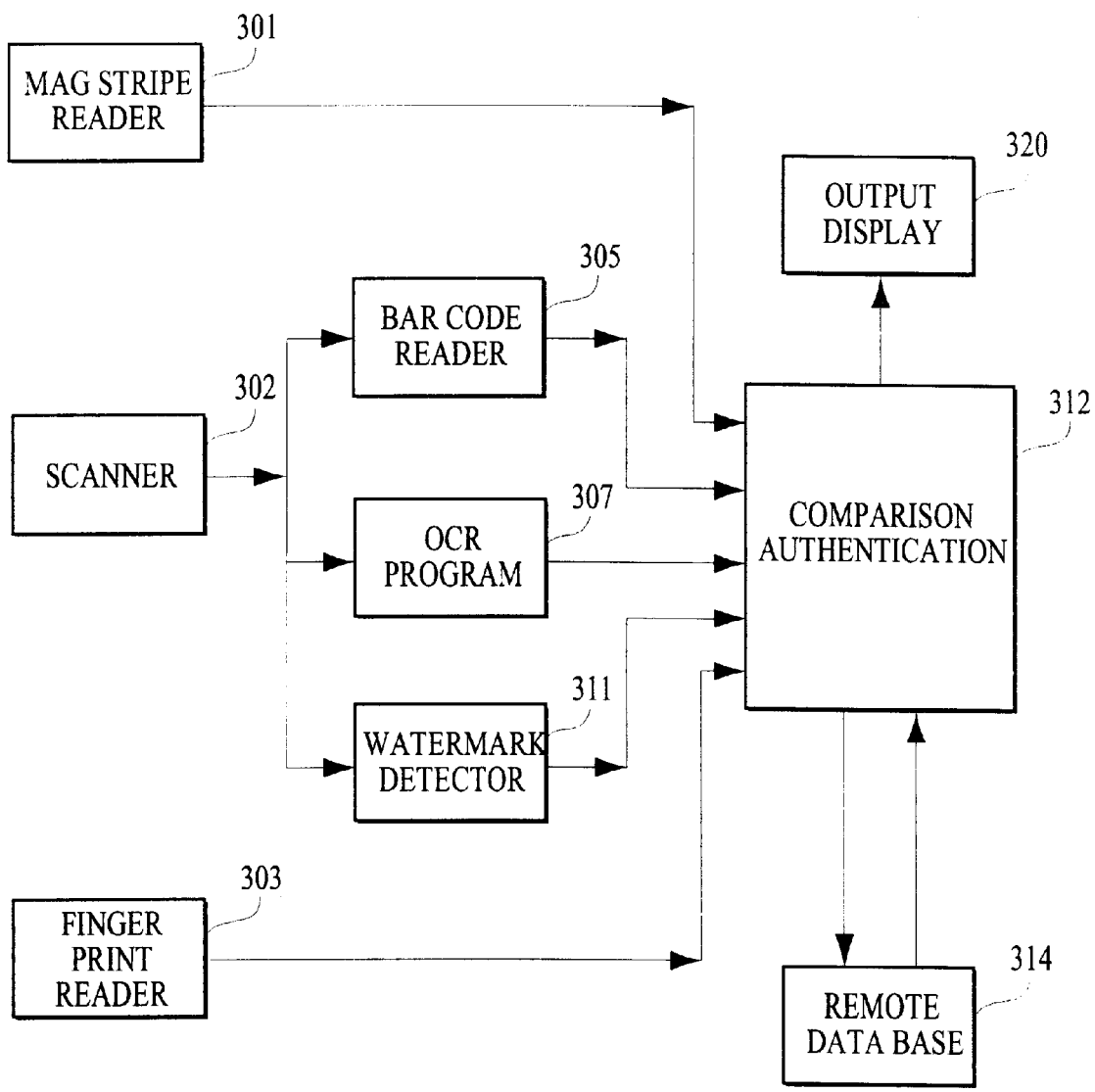
FIG. 3 is a diagram of a document validation system that operates in accordance with the present invention.

FIG. 3 is a diagram of a document self authentication unit in accordance with the present invention. The system has three input units, each of which is conventional and commercially available. The input units are a magnetic stripe reader 301, a high resolution image scanner 302, and a fingerprint reader 303. The document 10, shown in FIG. 1 does not include a magnetic stripe, but one of the alternatives for such a document is to include a magnetic stripe.

The output from scanner 305 goes to three units (that is, to three computer programs) 305, 307 and 311. Alternatively, the bar code reader 305 could be a separate unit which directly reads the bar code and provides information to comparison and authentication unit 312.

If the bar code reader 305 is a computer program which receives information from the output of scanner 302, The program 305 will read the bar code 17. OCR program 307 reads the text 15 and the text 16 and watermark detector 311 reads the watermarks in images 11, 12 and 14.

An authentication and comparison unit 312 which compares the data from units 305, 307 311 and 303 to determine if the data matches. If the data in some of the watermarks is encrypted, the comparison and authentication unit 312 would include an appropriate decryption program. The decryption program in unit 312 could obtain the decryption key from remote data base 314 in response to the number read by one of the devices. Alternatively, the encrypted data could be automatically sent to a central facility for decryption. The unit 312 can also access a remote data base 314 to determine if there is any special handling that is required for the document that has been presented. For example data base 314 could contain information about passports that have been cancelled for various reasons. The resulting information is displayed on a display unit 320.

We claim:

1. A document validating system that includes a physical characteristic reader for automatically reading a physical characteristic of a person presenting said document and multiple hidden digital watermarks from different elements of said document, and a comparator for comparing the output of said physical characteristic reader with information stored in said hidden digital watermarks.

2. A system for validating a security document, said document containing hidden digital watermarks that carry watermark payload data, said system comprising: a first computer system coupled to a second computer system, the second computer system being remote from the first, the first computer system including an optical scanner producing scan data corresponding to said document, the first computer system further including a digital watermark decoder receiving said scan data and outputting said watermark payload data, said watermark payload data being encrypted, the first and second computer systems cooperating to decrypt the watermark payload data.

3. The system of claim 2 in which said second computer has a memory storing decryption data, said data being transferred to the first computer for use at the first computer to decrypt the watermark payload data.

4. The system of claim 2 in which the second computer includes a decryption system having an input for receiving watermark payload data from the first computer, and an output for providing decrypted watermark payload data to the first computer.

5. The system of claim 2 in which the decryption proceeds in accordance with unencrypted payload data discerned by the first computer system from the scan data.

6. The system of claim 5 in which the unencrypted payload data comprises a document identifier printed on the document in OCR or bar code form.

7. A method of verifying the identity of a person who presents and identification document comprising the steps of automatically reading a physical characteristic of said person presenting said identification document, reading a hidden digital watermark from said identification document, and comparing the output of the physical reader with information stored in the hidden digital watermark.

8. A system for validating a security document presented by a person, said security document containing a hidden digital watermark that contains watermark payload data, said system comprising: a first computer system coupled to a second computer system, the second computer system being remote from the first, said first computer system including (a) an optical scanner producing a digital image of said security document, (b) a digital watermark decoder for reading watermark payload data from said digital image, and (c) a data input device which detects a physical characteristic of said person, said first and second computer systems cooperating to determine if said security document identifies said person.

* * * * *

UNITED STATES PATENT AND TRADEMARK OFFICE
CERTIFICATE OF CORRECTION

| | | |
|---|---|---|
| PATENT NO. | : 6,389,151 B1 | Page 1 of 1 |
| APPLICATION NO. | : 09/442780 | |
| DATED | : May 14, 2002 | |
| INVENTOR(S) | : Jonathan Scott Carr, Burt W. Perry and Geoffrey B. Rhoads | |

It is certified that error appears in the above-identified patent and that said Letters Patent is hereby corrected as shown below:

On the title page, under Item 54, delete and insert the following:

(54) -- VALIDATING SELF VALIDATING SECURITY DOCUMENTS WITH DIGITAL
WATERMARKS --

On the title page, under Item 63, Related U.S. Application Data, insert the following:

Related U.S. Application Data

(63) -- Continuation-in-part of U.S. patent application Ser. No. 09/074,034, filed
May 6, 1998 (now U. S. Patent 6,449,377) and a continuation-in-part of U.S. patent
application Ser. No. 08/763,847, filed Dec. 4, 1996 (now U.S. Patent 5,841,886)
which is a continuation of application 08/512,993, filed Aug. 9, 1995 (now
abandoned) --

Signed and Sealed this
Fifth Day of March, 2013

Teresa Stanek Rea
*Acting Director of the United States Patent and Trademark Office*